United States Patent van Buuren et al.

[11] Patent Number: 6,162,480
[45] Date of Patent: Dec. 19, 2000

[54] FORTIFICATION OF A VEGETABLE FAT WITH ANTIOXIDANTS

[75] Inventors: Jan van Buuren; Karel Petrus van Putte, both of Vlaardingen, Netherlands

[73] Assignee: Lipton, division of Conopco, Inc., Englewood Cliffs, N.J.

[21] Appl. No.: 09/282,777

[22] Filed: Mar. 31, 1999

[30] Foreign Application Priority Data

Apr. 14, 1998 [EP] European Pat. Off. .............. 98201179

[51] Int. Cl.⁷ ....................................... A23D 9/00
[52] U.S. Cl. ........................ 426/330.6; 426/486; 426/542; 426/601; 426/417
[58] Field of Search ..................... 426/270, 321, 426/324, 330.6, 542, 541, 601, 615, 489, 417; A23L 1/27, 3/34, 2/00

[56] References Cited

U.S. PATENT DOCUMENTS 5,417,998  5/1995  Scheibner ................................ 426/615

FOREIGN PATENT DOCUMENTS

| 2 192 566 | 1/1974 | France . |
| 2 337 509 | 1/1974 | France . |
| 2 499 368 | 8/1982 | France . |
| 58-087069 | 3/1984 | Japan . |
| WO 97/06697 | 2/1997 | WIPO . |
| WO 97/32947 | 9/1997 | WIPO . |

OTHER PUBLICATIONS

Garlick 1997 Cookery Hints & Tips A DK Publishing Book p 42.
Levinson 1965 The Complete Book of Pickles & Relishes Hawthorn Books Inc New York p 280–282.
Kamman 1977 The New Making of a Cook, 1st ed. William Morrow & Co. Inc New York p 304–307.
International Search Report dated Mar. 23, 1999.
J. Am. Oil. Chem. Soc. 1981, 11, pp. 966–968.

Primary Examiner—Carolyn Paden
Attorney, Agent, or Firm—Edward A. Squillante, Jr.

[57] ABSTRACT

For at least one day olive fruits are soaked in vegetable oil, preferably in olive oil, with the effect that polyphenols diffuse into the surrounding oil. The raise of polyphenols in this oil is at least 10 ppm. The migrating polyphenols typically are fat soluble polyphenols. Treated oils show an increased stabilty to oxidation. Their flavor has improved and often receives a higher appreciation than the flavor of the starting oil.

13 Claims, No Drawings

FORTIFICATION OF A VEGETABLE FAT WITH ANTIOXIDANTS

The present invention deals with vegetable oils and with a method to increase the level of anti-oxidants, particularly of olive polyphenols.

BACKGROUND OF THE INVENTION

The present invention deals with vegetable fats and oils, particularly with olive oil. Fats and oils form a substantial part of the average human food consumption. Since fat consumption is associated with an increased risk of cardiovascular disorders, the nutritional value of different types of fat as well as methods for reducing the amount of fat in food compositions had been the object of extensive investigations. Presently not only the triglyceride part of fats is the subject of such investigations, but also the nature and the effects on health of fat attributes, the so-called minor components which are present in small amounts in non-refined natural fats. It has recently been found that the minor components which are denoted as anti-oxidants, including fat polyphenols, positively interfere with the body's cardiovascular system.

Traditionally, most natural fats are refined before they are used as an ingredient for the preparation of food. However, traditional fat refining is not discriminating to the nature of the fat ingredients and aims at the removal of all substances other than triglycerides, including minor components.

Oils and fats aimed for human consumption are subjected to a refining treatment. Only for a minor part of those the refining is limited to a simple water washing and decantation or centrifugation. Such so-called virgin oils, particularly virgin olive oils, are much appreciated for their rich taste.

Most fats and oils, however, are purified and deodorised by a refining treatment under, often, drastic conditions. Impure olive oil e.g., traditionally is deodorized at temperatures of 250° C. or even more. Under such conditions also the oil's valuable minor components, including natural anti-oxidants, particularly the typical olive oil polyphenols are nearly fully stripped away.

WO 97/06697 teaches that food products can be fortified with anti-oxidants, including polyphenols. The patent particularly discloses the use of water soluble tea polyphenols.

Polyphenols present in olive oil are more or less fat soluble and have a chemical composition different from the water soluble polyphenols. They are presumed to play in the body an anti-oxidant role in specific tissues, possibly because of their fat solubility.

The introduction or re-introduction of polyphenols in refined vegetable oils, including olive oil, in a simple, natural and cheap way is the subject of the present invention.

SUMMARY OF THE INVENTION

We have found a method for fortification of vegetable oils with any ingredient of olive fruits, characterized in that olive fruits together with a vegetable oil are stored in a container of at least 5 liters, are allowed to soak in the oil for at least one day and finally are separated from the oil.

DETAILS OF THE INVENTION

The method is of utmost simplicity but with a quite beneficial effect. The treated oil shows a significant increase of useful minor components, particularly of polyphenols.

The method can be used for all types of vegetable oils such as rapeseed oil, corn oil, sunflower seed oil, soybean oil but olive oil is preferred. The oils may be refined or non-refined.

The invention is not limited to fortification of oils which are devoid of any polyphenol, either by nature or because of a refining process, but also of oils which contain polyphenols of their own such as virgin olive oils.

A raise of 10 ppm or more of polyphenols content is a significant increase. Usually polyphenols are present not as a single compound but as a mixture of different polyphenols.

Polyphenols are compounds which share a phenolic hydroxyl group. The main olive oil originating polyphenols comprise oleuropein, aglycon, tyrosol and hydroxytyrosol.

The total content of polyphenols in olive oils can be established by standard methods e.g. by the calorimetric Gutfinger method as described in J. Am. Oil. Chem. Soc. 1981, 11, pp. 966–968, which method is based on the reaction of a methanolic extract of olive oil and the Folin-Ciocalteau reagent. This method has been used for establishing the polyphenol values mentioned in the present patent specification.

The effect of the described process can be increased further when the olive fruits are first subjected to a treatment which enhances the transport of the olive fruit ingredients from the fruit into the oil. Such treatment comprises crushing, freezing and thawing, sonication, heat shock, drying and high pressure shock. Excluded are treatments which cause the disintegration of the olive fruits so that particles are formed.

A further measure to enhance the fortification effect is to select the harvest time of the olive fruits such that they have matured to their maximum polyphenols content, usually in the begin phase of their ripening. The olives should not be debittered since this causes a decrease of the polyphenols content. Usually GREEN olives give the best results.

Another aspect of the invention is the use of the fortified oils for the preparation of food compositions in which a vegetable oil is an ingredient. Such food compositions become enriched as well with the valuable polyphenols.

Such compositions may be spreads, as exemplified in our co-pending patent application PCT/EP 98/07797, but also food compositions other than spreads which are characterized by the presence of 5–100 wt. % of a vegetable oil, as are mayonnaises, dressings, tomato sauces and salad oils. The food compositions of the present invention contain at least 10 ppm, preferably at least 50 ppm, more preferably at least 200 ppm of olive oil originating polyphenols.

Processes for the manufacture of these compositions are well known in the art and need no illustration. Such compositions form part of the invention when at least a part of the usual oil ingredient have been substituted by the vegetable oil prepared according to the present invention.

Oils obtained according to the invention are further characterized by a specific partition of the various types of olive oil polyphenols, caused by the invented method of exporting polyphenols from their olive source to an oil destination. The polyphenols migration principally follow the dynamics of diffusion processes and the partition rules between fat phase (as present in oil and in olive) and aqueous phase (olive). The distribution of the various polyphenols over the phases is mainly dependent on the lipohilic/hydrophilic balance of each individual polyphenol.

The method of the invention uses a relatively slow diffusion process which requires an exposure time of at least one day, preferably at least two days, more preferably at least one week. An upper time limit does not exist, but flavour assessments have provided indications that flavour quality has a tendency to decline after thirty days. Therefore the fortification process is finalized by separation of the olives, preferably, after thirty days.

Various properties of the oil are changed by the increased polyphenols content. The oxidation stability of the oil is improved proportional to the increase of the polyphenols level.

A further surprising and beneficial effect which results from the present invention is the remarkable flavour improvement of a non-refined olive oil when treated according to the invention. See example 1.

Possibly, such impact on oil flavour could be ascribed, at least partially, to some absorption of off-flavour components to the fruit body of the olive.

Said flavour improvement can be established not only by an organoleptic assessment, but also by a measurable shift in the volatiles/non-volatiles balance. The volatiles are arbitrarily defined as the components of olive oil having a boiling point of at least 175° C., while all higher boiling components are denoted as non-volatiles. It is an established fact that the appreciation of olive oil flavour is proportional to the ratio of total amounts of volatiles and non-volatiles, which is the volatiles/non-volatiles balance.

During soaking of the olives in the olive oil the ratio of the balance increases during the first fortnight. After the next fortnight the increase is less.

This effect depends on the type of olives. No ratio increase was found when green, debittered olives were used.

The invention is not restricted to oils which have a vegetable origin. The use of a fat blend which partly consists of vegetable fat and partly of animal fat and/or marine oils and/or fats derived from such fats/oils by fractionation or interesterification, might be advantageous.

Fat and oil are terms used in this specification interchangeably. The term oil is rather used when the fat at ambient temperature is liquid. Since the soaking with olive fruits is carried out usually at or close to ambient temperature (20°–25° C.) the fat should have a liquid consistency.

Jars and bottles filled with at least olive oil and olives, often supplemented with some herbs are sold as retail products with a fancy appearance. These products have nothing to do with the industrial fortification process as described in the present specification. Said industrial processes are carried out on a large scale employing vessels having a content of at least 5 liter, preferably at least 20 liter, more preferably at least 50 liter, even more preferably at least 100 liter.

The invention is illustrated by the following examples:

EXAMPLE 1

POLYPHENOLS FORTIFICATION

TABLE I

| Olive oil | POLYPHENOLS CONTENT (ppm) | |
|---|---|---|
| | Paranzane olives | Leccino olives |
| Untreated Toscane virgin olive oil | 270 | 420 |
| when soaked 30 days with non-debittered olives | 337 | 591 |

Toscane non-debittered olives (10 wt. %) were slowly stirred with Toscane extra virgin olive oil during 30 days.

The increase of polyphenols in the olive oil is shown in Table I.

EXAMPLE 2

POLYPHENOLS FORTIFICATION

Italian non-debittered olives (25 wt. % of Castel olives on oil) were slowly stirred with French PUGET extra virgin olive oil during only one day. The polyphenols content was measured before and after soaking. The treatment was repeated but with 25 wt. % of Grevepesa olives.

The increase of polyphenols in the olive oil is shown in Table II.

TABLE II

| Olive Oil | POLYPHENOLS CONTENT (ppm) | |
|---|---|---|
| | Castel olives | Grevepesa olives |
| Untreated French virgin olive oil | 169 | 169 |
| when soaked with non-debittered olives | 180 | 205 |

EXAMPLE 3

FLAVOUR ASSESSMENT 1 l of Toscane extra virgin olive oil was stirred for 26 days in the dark at 25° C. with 100 g of black, intact, debittered olives from Turkey. The olive oil surface was protected by a layer of nitrogen gas. A parallel experiment was carried out but using green olives.

TABLE III

| Sample | FLAVOUR ASSESSMENT | |
|---|---|---|
| contact time (days) | Black olives with olive oil | Green olives with olive oil |
| 0 | little bit fruity, no strong taste | little bit fruity, no strong taste |
| 2 | clearly perceptible shift of taste | little bit flat taste |
| 5 | new taste has intensified | sweet and mild taste |
| 9 | taste identical to the olive fruits, no aftertaste | mild and a little aftertaste |
| 14 | taste has further intensified | taste becomes flatter aftertaste perceptible |
| 26 | still stronger black olives taste, no aftertaste | taste defective aftertaste |

After specific time intervals samples were subjected to a flavour assessment (Table III) and also the ratio of volatiles and non-volatiles was established (Table IV).

TABLE IV

| Sample | RATIO VOLATILES/NON-VOLATILES | |
|---|---|---|
| contact time (days) | Black olives with olive oil | Green olives with olive oil |
| 0 | 2.8 | 2.8 |
| 14 | 3.7 | 0.5 |
| 26 | 1.4 | 0.2 |

What is claimed is:

1. A method for fortification of a vegetable oil with any ingredient of olive fruits comprising combining the olive fruit with a vegetable oil to form a mixture soaking the mixture in a container of at least 5 liters for at least one day separating the oil from the olive fruits to form a fortified vegetable oil.

2. Method according to claim 1, where the vegetable fat is olive oil.

3. Method according to claim 1, where the ingredient is a polyphenol or a mixture of polyphenols.

4. Method according to claim 1, where the fortification results in an increase of the polyphenols content with at least 10 ppm.

5. Method according to claim 1, where the olive fruits have been subjected to a treatment which enhances transport of the desired olive ingredient from the olive into the oil.

6. Method according to claim 5, where the treatment is chosen from crushing, freezing and thawing, sonication, drying, heat shock and high pressure shock.

7. Method according to claim 1, where olives are chosen which have been harvested in the month when the olives have their maximum polyphenols content.

8. Method according to claim 1, where the container has a volume of at least 20 liters.

9. Method according to claim 1, where the container has a volume of at least 100 liters.

10. Vegetable oil fortified according to claim 1.

11. Food composition prepared with an oil according to claim 10.

12. The method according to claim 1 wherein the olive fruits have only begun to ripen.

13. The method according to claim 1 wherein the olive fruits have not been debittered.

* * * * *